United States Patent [19]
Kuipers

[11] 3,930,039
[45] Dec. 30, 1975

[54] METHOD OF PREPARING A PROTEIN CONCENTRATE FROM WHEY

[75] Inventor: Arie Kuipers, Reitmehring, Germany

[73] Assignee: Molkerei J. A. Meggle, Milchindustrie, Reitmehring, Germany

[22] Filed: Apr. 25, 1974

[21] Appl. No.: 463,868

Related U.S. Application Data

[63] Continuation of Ser. No. 185,441, Sept. 30, 1971, abandoned.

[30] Foreign Application Priority Data

July 30, 1971 Germany............................ 2138277

[52] U.S. Cl. ................. 426/271; 260/122; 426/41; 426/491; 426/583
[51] Int. Cl.² ..................... A23C 21/00; A23C 9/14
[58] Field of Search ....... 426/41, 43, 185, 187, 271, 426/491, 358, 356, 583; 260/122

[56] References Cited
UNITED STATES PATENTS

| | | |
|---|---|---|
| 2,377,624 | 6/1945 | Gordon............................ 260/122 X |
| 2,566,477 | 9/1951 | Abrahamczik et al................ 426/41 |
| 2,602,746 | 7/1952 | Meade................................ 426/358 |
| 2,710,808 | 6/1955 | Peebles et al................... 426/429 X |
| 3,757,005 | 9/1973 | Kanbz et al...................... 426/491 X |

OTHER PUBLICATIONS

"Membrane Separation Processes for the Abatement of Pollution from Cottage Cheese Whey;" Horbow et al.; 3–11–70; pp. 3–6; 99–57.
"Fortifying Soft Drinks with Cheese Whey Protein;" Holsinger et al.; Food Technology, February 1973; pp. 59–62.

*Primary Examiner*—S. Leon Bashore
*Assistant Examiner*—Kenneth M. Schor
*Attorney, Agent, or Firm*—Hans Berman

[57] ABSTRACT

When whey is adjusted to pH 2.7 – 3.3, that is, below the isoelectric point of the whey protein, the adjusted whey may be subjected to ultrafiltration at a higher rate than at the isoelectric point under otherwise identical conditions, and the adjusted whey may be sterilized by pasteurizing or at high temperature without precipitation or coagulation of protein. The whey protein concentrate is a food or food supplement and may be spray-dried if desired.

8 Claims, No Drawings

METHOD OF PREPARING A PROTEIN CONCENTRATE FROM WHEY

This is a continuation of application Ser. No. 185,441, filed Sept, 30, 1971, now abandoned.

This invention relates to a method of preparing a protein concentrate from whey, and more particularly to the separation of a protein-rich whey fraction from a fraction enriched with solid whey constituents of lower molecular weight by ultrafiltration.

It has been disclosed in the published Dutch Pat. application No. 70 10 656 that milk and whey may be separated by ultrafiltration into two fractions of which one is a concentrate of milk or whey protein and contains but a small fraction of the solid constituents of lower molecular weight initially present as solutes in the milk or whey. It is an advantage of this method that the protein in the concentrate is not chemically altered, a result not previously available. It is a disadvantage of the method that the starting material is usually of uncertain microorganism content, and that the method does not interfere with the propagation of microorganisms. The product ultimately obtained thus can be substantially free from microorganisms only if the starting material is substantially sterile, and sterility is maintained during processing. Whey is not sterile unless heated under conditions more severe than those of conventional pasteurizing which cause incipient flocculation of the protein present. Such a partly denatured whey, however, is not readily capable of being subjected to ultrafiltration.

The primary object of the invention is a modification of the afore-described method which permits a protein concentrate of satisfactory bacteriological properties and acceptable taste to be prepared from whey which may be contaminated with microorganisms as is usual.

The invention is based on the finding that the processing characteristics of whey relevant to the preparation of a milk protein concentrate by ultrafiltration are changed radically when the pH value of the whey is reduced below the isoelectric point of the milk protein in the whey, and preferably to a value of 2.7 to 3.3.

When whey is pasteurized prior to ultrafiltration according to the known method, the microorganisms content of the protein concentrate produced is still too high because reinfection during processing cannot be avoided under practical and economically tolerable conditions. The known concentrate is not capable of being sterilized at elevated temperature because a substantial portion of the protein is precipitated by the heat treatment. The precipitate coats heat exchanger surfaces to make the heat exchanger ineffective and may clog conduits. It is difficult to protect the concentrate from local overheating under such conditions, and the flavor of the product is affected thereby. The protein lost by precipitation constitutes a significant portion of the product, thereby increasing the cost of the recovered sterilized material.

It has now been found that whey adjusted to a pH of preferably 2.7 to 3.3 may be sterilized under conventional pasteurizing conditions or at higher temperatures before or after ultrafiltration without precipitation of the protein, and at least one such thermal sterilizing step is necessary for a microorganism content in the product suitable for human consumption. A whey adjusted to this pH range has a maximum protection against microbiological propagation within the equipment. It is surprising that even the concentrate resulting from ultrafiltration may be heated to the high temperatures customary only in uperization without the precipitation of protein. A whey protein concentrate of the invention may thus be sterilized by indirect heating, no significant flocculation of the protein being observed.

At the low pH values characteristic of this invention, spore forming microorganisms and their spores are killed practically completely at temperatures above 85°, the preferred sterilization temperature being 90° to 100°C. The invention thus permits practically sterile whey protein concentrate to be produced, and further processing of the concentrate, if desired, is feasible under conditions which avoid re-infection.

The origin of the whey employed as a starting material is not critical. Whey processed successfully according to the method of the invention has been obtained from plants producing cheese by means of rennet or from cultured milk, and from factories producing casein by means of rennet or acid. Some wheys successfully processed according to the invention had been stripped partly of their sugar content or of their sugar and salt content. Wheys of different origin were mixed prior to processing according to the invention without affecting the results achieved. The term whey, as employed in this specification, unless specifically stated otherwise, will be understood to cover wheys that had undergone previous treatment for removal of some constituents, and the removed constituents may include a portion of the water content.

Ordinary whey, in the narrow sense of the word, contains approximately 6% solids. The preferred solids concentration in the starting material of the invention is between 6 and 15%, all percentage figures herein being by weight. A lower solids content reduces the output of the ultrafiltration plant because of the amount of water to be removed. At more than 15% solids, the whey becomes relatively viscous and thus difficult to filter. However, concentrations higher than 15% may be handled successfully and economically by multi-stage ultrafiltration in which a first concentrate is diluted and again subjected to ultrafiltration for removal of additional constituents having a molecular weight lower than that of the whey protein.

While a pH value of 2.7 to 3.3 facilitates processing, lower pH values may be used when necessary precautions are taken to avoid protein hydrolysis which is favored by low pH and causes deterioration of the flavor. Thus, the very acid whey should not be heated prior to ultrafiltration, and the concentrate should be partly neutralized prior to heating.

The pH of the whey may be adjusted to a value lower than the isoelectric point of the protein therein, and preferably to a value between 2.7 and 3.3, by any known method. Thus, acids may be added, or hydrogen may be substituted for other cations in the whey by means of ion exchange resins or by electrodialysis. It is also possible to lower the pH by the use of microorganisms such as Lactobacillus helveticus, as is well known in itself.

When the microorganisms present in the starting material are to be destroyed prior to ultrafiltration, it is advantageous to operate at temperatures customary in pasteurizing, and preferably below 75°C, the temperature range of 70° to 75°C having known advantages. Under these conditions, the milk protein is not or not significantly altered.

The concentrate obtained by ultrafiltration may be sterilized under pasteurizing conditions, but also at much higher temperatures such as those employed in uperization. Temperatures above 85°C are preferred. At sterilization temperatures above 100°C, indirect heating requires apparatus which does not form a film of solids on the heating surfaces. Such higher temperatures are readily achieved by blowing steam into the concentrate, and the content of viable microorganisms may be reduced to a minimum thereby.

The apparatus employed for the heat treatment is conventional and well known to workers in this art. Plate-type heat exchangers are particularly suitable for the heat treatment of the starting material, but may also be used for sterilizing the concentrate because the protein remains in solution under the pH conditions of this invention. The specific heating conditions employed may be chosen quite freely depending on the degree of sterilization required and the degree of protein denaturation that is permissible. There is no critical upper temperature limit other than that set by the permission decomposition of the product.

Ultrafiltration is in itself a conventional process not requiring more detailed explanation. The pore size of the filter or membrane employed is chosen to retain the protein molecules as far as possible while being permeable not only to water, but also to solutes having much lower molecular weights than the protein such as inorganic and organic salts (citrates, lactates etc.) and lactose. The filtrate should not contain more than 0.1 to 0.15% protein. The upper limit of solids in the concentrate is approximately 25%. Higher solids contents are not readily achieved in continuous operation. Even a concentration of approximately 25% is best obtained in at least two stages. Such a procedure has the added advantage of removing more lactose from the concentrate than is possible in a single passage through the ultrafiltration zone. The acidified whey may be filtered batchwise or pass over a semi-permeable membrane or other filtering medium in a continuous stream.

The pH of the concentrate may be adjusted as may be called for by subsequent processing steps or by the ultimate use. Partial or complete neutralization may be achieved in any known manner, as by addition of alkali metal or alkaline earth metal citrates, carbonates, or hydroxides. Intimate mixing of the alkaline material with the concentrate is necessary to avoid localized, excessive alkalinity. The neutralizing agents employed may be chosen to achieve a proportion of cations in the ultimate product which differs from that in normal whey. The product may thus be enriched with or partly stripped of calcium, potassium, or sodium ions.

The viscous, liquid concentrate resulting from ultrafiltration may be employed as such as a food supplement, or it may be converted to a solid concentrate by drying, as by spray-drying or freeze-drying. The desirable properties of the whey protein of the invention are maintained under the normal conditions of spray-drying.

The known method of producing a whey protein concentrate by ultrafiltration was not capable of continuous operation because the known operation near a neutral pH favors propagation of microorganisms in the processing zone so that a useful product could not be obtained. Continuous ultrafiltration, known in itself, is practical according to the method of the invention in which microorganisms may be destroyed by heat without affecting the process and the product.

It was commonly assumed heretofore that low pH values are to be avoided in the processing of milk protein if the flavor and taste are not to be affected unfavorably. Quite surprisingly, it has been found that no significant, irreversible change in flavor and taste is caused by processing at approximately pH 3 according to the invention, the normal taste being restored by partial neutralization. The fraction of denatured protein present in the product of the invention is very low and much lower than in whey protein processed at pH values close to its isoelectric point. The normal taste is also found in products of the invention which are practically sterile.

Processing conditions according to the invention are such as to permit significant savings in thermal energy. When the concentrate is sterilized, the weight of the material to be sterilized is relatively small. Simple, plate-type heat exchangers may be employed at high efficiency because the heat transmitting surfaces are not coated with protein, and clogging of passages is safely avoided.

The capacity of the ultrafiltration equipment is high in the pH range of this invention, and the material throughput is close to the maximum values that can be achieved, under otherwise constant conditions, at a pH of 6. It is significantly higher than the throughput values capable of being achieved near the isoelectric point of the protein, or at pH values in the weakly alkaline range.

The invention will be further illustrated by the following Examples.

EXAMPLE 1

1000 Liters sweet whey containing 4.8% lactose, 0.8% protein, and 0.5% ash were divided into two approximately equal batches, and one batch was passed over a column of cation exchange resin of the H type. The effluent, which had a pH of 1.5 to 1.8 was mixed with the untreated batch to produce a mixture having a pH of 2.8 to 3.2 and containing 4.8% lactose, 0.75% protein, and 0.35% ash, the remainder essentially consisting of water.

The mixture was pasteurized in conventional dairy equipment under the usual conditions and thereafter subjected to ultrafiltration. The filtrate of about 900 liters contained 4.6% lactose, 0.2% protein, and 0.3% ash. The concentrate of 100 liters contained 6.6% lactose, 5.7% protein, and 0.8% mineral matter or ash for a total of 13.1% solids.

The procedure, when performed in continuous stream on pilot plant equipment, produced substantially the same concentrate.

The concentrate was further treated in a falling film evaporator to increase the solids content to 30%, neutralized, and solidified in a spray drier.

EXAMPLE 2

The solids in the filtrate produced per hour under the conditions of Example 1 were determined, and the procedure of Example 1 was modified in several additional runs by changing the pH of the mixture prior to ultrafiltration.

The rate of filtration as expressed in kilograms of solids in the filtrate per hour per square meter of filtering surface was 1.1 at pH 3 (Example 1). It dropped to 0.64 kg/hr/m$^2$ at the isoelectric point and rose to 1.28 kg/hr/m$^2$ at pH 6. At a pH above 6.5 it dropped and reached the same value as at pH 3 when at pH 7.

An attempt was made to evaporate the concentrates produced at pH 6 and at the isoelectric point respectively to a solids content of 30%, and thereafter to spray-dry the material. A substantial amount of the protein was precipitated from both condensates in the falling film evaporator, and the spray-dried products had an unsatisfactory taste.

EXAMPLE 3

The concentrate obtained by ultrafiltration in Example 1 was diluted with an equal amount of water to 3.3% lactose, 2.85% protein, and 0.4% mineral matter. 100 Liters of the diluted material were again subjected to ultrafiltration. The filtrate (75 liters) contained 3.2% lactose, 0.05% protein, and 0.3% ash. The concentrate (25 liters) contained 3.6% lactose, 11.25% protein, and 0.7% mineral matter. It was further stripped of water in a falling film evaporator to 20% solids and spray-dried.

An equal weight of water is usually most advantageous as a diluent. When less water is added, the benefits derived from the second filtration step are lost as the amount of water approaches zero. There is no upper limit to the dilution, but the process becomes less economical as the amount of water again to be removed is increased.

EXAMPLE 4

The concentrate obtained by ultrafiltration in Example 1 was passed over a plate-type heat exchanger to raise its temperature to 80°C, and live steam was injected into the preheated material with vigorous agitation to further raise its temperature to 90° to 95°C. No coagulation whatsoever could be observed while this temperature was maintained for ten minutes, and the sterilized product was an opaque, fluid mass. It was spray-dried to produce a pulverulent food supplement.

Bacteriological examination of the product revealed less than 10 germs, fungus or yeast cells per gram, and less than 10 aerobic spore forming microorganisms per gram. The Weinzirl test for anaerobic spores was negative after five days.

EXAMPLE 5

1000 kg Acid whey from the manufacture of cottage cheese and containing 4.3% lactose, 0.75% protein, 0.65% ash, and 0.5% lactic acid was passed over a cation exchange resin column. The effluent had a pH of 1.5 to 1.8 and contained 4.3% lactose, 0.7% protein, 0.35% ash, and 0.5% lactic acid. The acidified whey was mixed with approximately 300 kg of an acid whey concentrate containing 21% lactose, 3.7% protein, 3.3% ash, and 2.5% lactic acid. The mixture contained 12% solids including 8.1% lactose, 1.4% protein, 1.03% ash, and 0.65% lactic acid, and had a pH of 2.8 to 3.1. When subjected to ultrafiltration, it yielded 1170 kg of a filtrate containing 7.8% lactose, 0.4% protein, 0.9% ash, and 0.9% lactic acid. There was also obtained 130 kg concentrate containing 10.8% lactose, 10.4% protein, 2.2% ash, and 1.2% lactic acid.

A portion of the concentrate was converted to a powder by spray-drying as described in Example 1, and another portion was additionally sterilized as described in Example 4.

The whey referred to in the preceding Examples was derived from cow's milk. Limited experiments indicate that whey obtained from the production of cheese from goat's milk and sheep's milk equally benefits from pH adjustment prior to ultrafiltration. Cow's milk, however, is the sole, economically practical source of protein for whey protein concentrate at this time. Yet, there is no reason to assume that the milk of any mammal would not be capable of being processed in accordance with this invention.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A method of preparing a protein concentrate from whey which comprises:
    a. adjusting the pH of said whey to a value between 2.7 and 3.3;
    b. heating said whey at said adjusted pH value to a temperature between 70° and 75°C until sterile; and
    c. subjecting said whey after said heating at said adjusted pH value to ultrafiltration through a filtering medium, thereby passing a filtrate through said medium and separating said filtrate from a liquid concentrate retained by said medium,
        1. said concentrate containing a higher percentage of solids than said filtrate, and
        2. the weight ratio of protein to whey solids of a molecular weight lower than the molecular weight of said protein being higher in the solids of said concentrate than in the solids of said filtrate.

2. A method of preparing a protein concentrate from whey which comprises:
    a. adjusting the pH of said whey to a value between 2.7 and 3.3;
    b. subjecting said whey at the adjusted pH value to ultrafiltration through a filtering medium, thereby passing a filtrate through said medium and separating said filtrate from a liquid concentrate retained by said medium,
        1. said concentrate containing a higher percentage of solids than said filtrate, and
        2. the weight ratio of protein to whey solids of a molecular weight lower than the molecular weight of said protein being higher in the solids of said concentrate than in the solids of said filtrate; and
    c. heating said concentrate to a temperature higher than 85°C at said adjusted pH value until sterile.

3. A method of preparing a protein concentrate from whey which comprises:
    a. adjusting the pH of said whey to a value lower than the isoelectric point of the protein in said whey;
    b. subjecting said whey at the adjusted pH value to ultrafiltration through a filtering medium, thereby passing a filtrate through said medium and separating said filtrate from a liquid concentrate retained by said medium,
        1. said concentrate containing a higher percentage of solids than said filtrate, and
        2. the weight ratio of protein to whey solids of a molecular weight lower than the molecular weight of said protein being higher in the solids of said concentrate than in the solids of said filtrate; and
    c. heating said concentrate at said adjusted pH value to a temperature of at least 70°C until sterile.

4. A method as set forth in claim 3, wherein the solids content of said whey prior to said ultrafiltration is between 6% and 15% by weight.

5. A method as set forth in claim 3, wherein said concentrate is diluted with water, and the diluted concentrate is subjected to ultrafiltration for removal therefrom of additional whey solids of said lower molecular weight.

6. A method as set forth in claim 3, wherein said pH of said whey is adjusted to said lower value by substitution of hydrogen ions for cations other than hydrogen in said whey.

7. A method as set forth in claim 6, wherein said hydrogen ions are substituted for said other cations by contacting said whey with a cation exchange resin in the H form.

8. A method as set forth in claim 3, wherein said adjusted pH is at least 2.7 and said temperature is higher than 85°C.

* * * * *